United States Patent
Underhill

[19]

[11] Patent Number: 6,096,198
[45] Date of Patent: Aug. 1, 2000

[54] APPARATUS FOR CONDITIONING METAL CUTTING FLUIDS

[75] Inventor: Jasper Underhill, Sanger, Tex.

[73] Assignee: Halliburton Energy Services, Inc., Dallas, Tex.

[21] Appl. No.: 09/096,420

[22] Filed: Jun. 11, 1998

[51] Int. Cl.⁷ .................................................. B01D 17/032
[52] U.S. Cl. .......................... 210/123; 210/168; 210/171; 210/198.1; 210/205; 210/525; 210/319; 261/3; 261/7; 261/83; 261/119.1; 451/67; 451/450
[58] Field of Search .............................. 210/242.3, 242.4, 210/259, 262, 255, 521, 523, 525, 540, 97, 99, 167, 168, 171, 103, 104, 121, 122, 123, 124, 198.1, 319, 205, 248, 416.5; 261/2, 3, 7, 83, 119.1; 451/65, 67, 259, 449, 450

[56] References Cited

U.S. PATENT DOCUMENTS

| | | |
|---|---|---|
| 3,338,414 | 8/1967 | Lefke et al. . |
| 3,358,838 | 12/1967 | Kosar et al. . |
| 4,051,024 | 9/1977 | Lowe et al. . |
| 4,172,036 | 10/1979 | Morris . |
| 4,220,533 | 9/1980 | Baer et al. ............................... 210/223 |
| 4,360,429 | 11/1982 | Morris .................................... 210/242.3 |
| 4,642,185 | 2/1987 | Turner et al. .......................... 210/242.3 |
| 4,651,762 | 3/1987 | Bowden .................................... 210/305 |
| 4,797,205 | 1/1989 | Kitamura .................................... 210/86 |
| 5,522,990 | 6/1996 | Davidian . |

OTHER PUBLICATIONS

Zebra Skimmers Corp., Disk Skimmers.
Blaser Swisslube Inc., Material Safety Data Sheet Blasocut 2000 Universal, Art. No. 870, Mar. 26, 1993.

*Primary Examiner*—Robert J. Popovics
*Attorney, Agent, or Firm*—William M. Imwalle; John F. Booth

[57] ABSTRACT

Apparatus for maintaining the condition of cutting fluids in a machine tool sump and for the removal of tramp oil from the cutting fluid has a pump to draw cutting fluid from the machine tool sump and transfer the fluid to an auxiliary tank where the fluid outlet is directed to drive a turbine wheel for rotation of a shaft and simultaneously aerate the cutting fluid. Drums on the shaft are partially submerged so as to be wetted by the tramp oil content. Wiper blades bear against the drum surfaces to strip the tramp oil from the drums as they rotate. A collecting trough is positioned below the wiper contact line to receive the tramp oil as it is stripped from the drum and drain it off to a waste container. In this manner, the cutting fluid is in constant circulation, even when the machine tool is idle.

23 Claims, 4 Drawing Sheets

APPARATUS FOR CONDITIONING METAL CUTTING FLUIDS

TECHNICAL FIELD

The present invention relates to the field of cooling and lubricating fluids, as used for improving the performance of metal cutting tools, and most particularly, to methods and apparatus used for cleaning and conditioning such metal cutting fluids.

BACKGROUND OF THE INVENTIONS

Cutting fluids can improve the performance of metal cutting tools by cooling both the cutting tool and the workpiece, by lubricating the cutting and non-cutting surfaces on the tool, by inhibiting seizure between the chip and the tool, and by flushing the chips from the work area. The benefits of using cutting fluid can be a lowered tool force, improved tool life or a faster cutting speed, improved surface finish on the machined surface and better control on the accuracy of machined dimensions. Cutting fluids are also used on grinding operations to cool the workpiece and improve the surface finish. Rust prevention on machined surfaces is another important cutting oil contribution.

Water-base soluble or emulsifying oils are sometimes classified as aqueous cutting fluids. These fluids are commonly a mixture of mineral oil with an emulsifying agent and may include corrosion and fungi inhibitors along with bactericides and other specialized additives. When such oils are mixed with water, an emulsion is formed rather than a solution, but the term "soluble oil" has been generally accepted. Depending upon the application, these oils are mixed with water in concentrations ranging from five to seventy parts of water to one part of oil. Soluble or emulsifying oils are very effective coolants and are considered as inexpensive, general-purpose cutting fluids for almost all machining and grinding operations.

Chemical or synthetic cutting fluids is true solutions of organic and inorganic materials in water, with little or no petroleum product content. These chemical or synthetic fluids may include added lubricants and wetting agents or such additives may be omitted. Chemical cutting fluids containing lubricants and wetting agents are recommended for use on tough machining operations such as tapping, sawing, broaching, gear shaving and gear cutting as well as turning, milling and drilling. They are excellent rust inhibitors and have high heat conductivity but have a tendency to foam in some applications.

Chemical cutting fluids which do not contain lubricants or wetting agents are clear solutions which do not foam readily and are also excellent coolants and rust inhibitors. They are recommended for surface grinding but not for severe machining operations where their lack of lubricity is a disadvantage. Such solutions have a significant advantage in resisting the growth of undesirable bacteria.

The growth of bacteria is a common problem with cutting fluids and if unchecked, will lead to the deterioration of cutting fluid performance. So called "tramp oil", from machine tool lubricants, the parts being machined and other sources contaminates the cutting fluid over a period of time. This not only brings more undesirable anaerobic bacteria into the fluid but, the tramp oil also provides nutrients and a breeding ground for the bacteria. As a result, bacteria colonies tend to form where tramp oils collect. In a stagnant situation, the bacteria waste materials also interact with the tramp oil and cutting fluid to form gelatinous matter, which tends to clog the cutting fluid circulation system. Maintaining constant circulation and or agitating cutting oils tends to prevent the formation of colonies and aeration tends to discourage bacteria growth. Tramp oil rises to the top since it is lighter than the aqueous cutting fluids and it is desirable to make a practice of periodically skimming it off to diminish the contamination potential.

It is particularly desirable to extend the useful life of cutting fluids inasmuch as most of these products are hazardous wastes under prevailing EPA guidelines and as such, require expensive disposal measures.

Therefore, the first object of the present invention is to provide an improved method and apparatus for maintaining the condition of the cutting oil supply of a machine tool. A second object is that this improved apparatus should provide simultaneous operation of the cutting fluid circulation pump, cutting fluid aeration and tramp oil separation. A third object is to provide this improved apparatus in a form that is inexpensively made and readily installed as an accessory on virtually any machine tool.

SUMMARY OF THE INVENTIONS

The present inventions contemplate improved apparatus for maintaining the condition and performance of machine tool cutting fluids. Practice of the present inventions uses some steps and apparatus well known in the fluid pumping, circulating and separating arts and therefore, not the subject of detailed discussion herein.

In a preferred embodiment of the present inventions, an auxiliary tank is provided to receive cutting fluid circulated by either an accessory pump or the machine tool coolant pump. The cutting fluid is pulled from the machine tool sump and introduced into the auxiliary tank through a flow velocity-accelerating nozzle. As the cutting fluid leaves the nozzle it impinges upon the buckets of a turbine wheel so as to be dispersed and aerated. At the same time, the over-spray not impinging on a bucket serves to further agitate the fluids in the auxiliary tank. The turbine wheel is driven to rotate a primary shaft about a horizontal axis. A parallel shaft reduction gear drive reduces the rotating speed of the primary shaft to a secondary shaft speed of approximately one revolution per minute. At least one round drum member is mounted on the secondary shaft, where it rotates about a horizontal axis, with the drum partially submerged in cutting fluid. Tramp oil, which floats to the surface of the cutting fluid and has a greater surface tension, tends to displace the cutting fluid and cling to the surface of the rotating drum. In this manner, tramp oil is separated from the cutting fluid and lifted to a wiping blade, where it is stripped from the surface of the rotating drum. Then, the tramp oil flows from the wiping blade to a collecting trough and is drained off to a tramp oil receptacle. In an alternative embodiment, a hydraulic motor, inside the auxiliary tank, is driven by the cutting fluid pump to provide continuous circulation and agitation of cutting fluid and, at the same time, drive the rotation of the separating drum shaft. It is also envisioned that electric or other motor power sources could be used. Tramp oil is separated from the cutting fluid in the same manner as in the first embodiment. In the alternative embodiment, aeration is achieved by dispersion of the cutting fluid in the air as it is introduced into the auxiliary tank and agitation is achieved by circulation and augmented by a partially submerged agitating wheel. In yet another embodiment, an electric motor inside the auxiliary tank is connected in parallel with the cutting fluid pump motor so as to provide for shaft rotation in a manner otherwise similar to the alternative embodiment.

BRIEF DESCRIPTION OF THE DRAWINGS

The accompanying drawings are incorporated into and form a part of the specification to assist in explaining the present inventions. The drawings illustrate preferred and alternative examples of how the inventions can be made and used and are not to be construed as limiting the inventions to only those examples illustrated and described. The various advantages and features of the present inventions will be apparent from a consideration of the drawings in which.

DETAILED DESCRIPTION OF THE DRAWINGS

Figure 1:
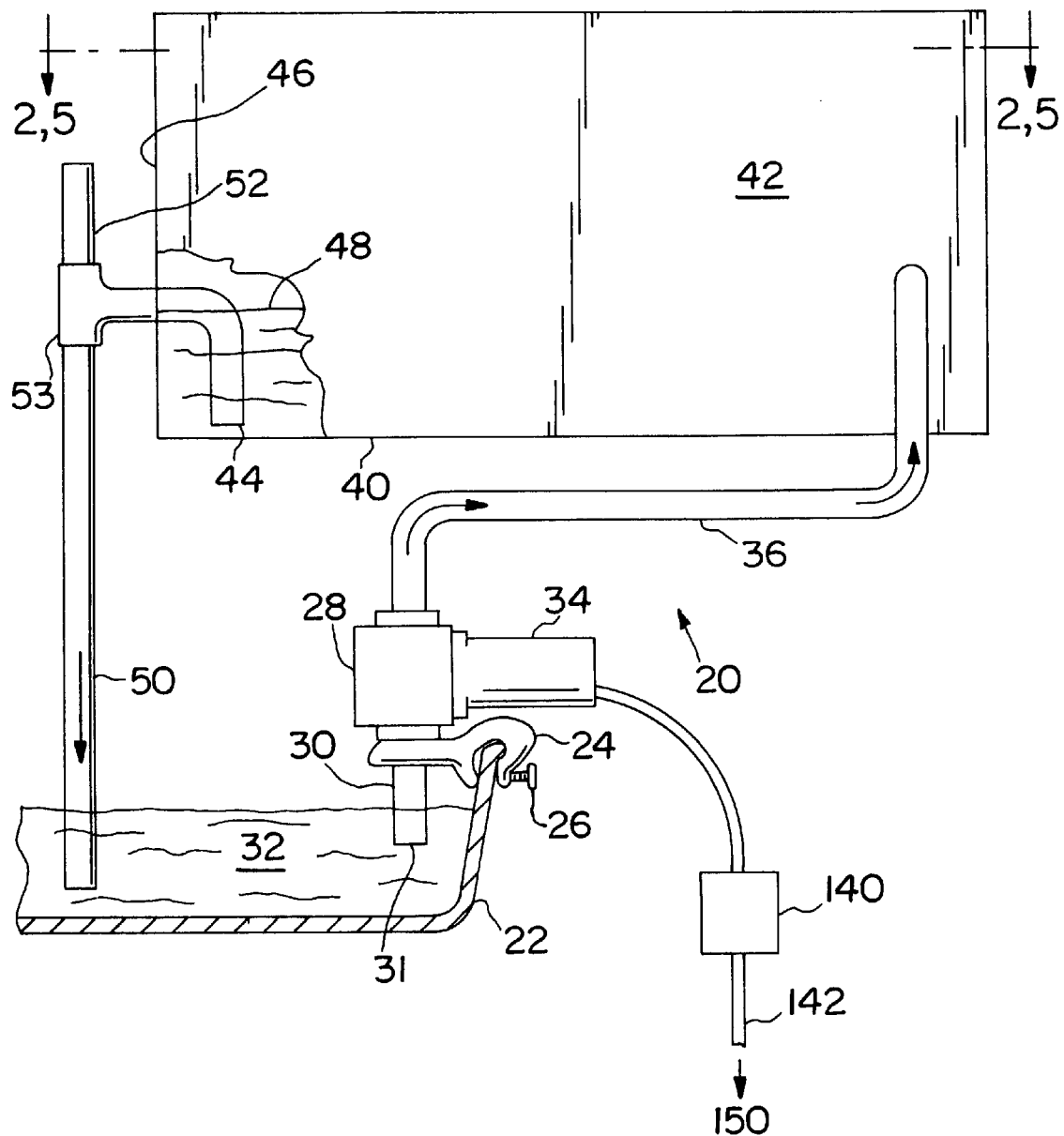
FIG. 1 shows a side view of a preferred embodiment of the present inventions as installed on a typical machine tool cutting fluid sump.

The embodiments shown above and described herein are exemplary. Many details are well known in the art, and as such are neither shown nor described. It is not claimed that all of the details, parts, elements, or steps described and shown were invented herein. Even though numerous characteristics and advantages of the present inventions have been described in the drawings and accompanying text, the description is illustrative only, and changes may be made in the detail, especially in matters of shape, size, and arrangement of the parts within the principles of the inventions to the full extent indicated by the broad general meaning of the terms used in the attached claims.

FIG. 1 is illustrative of forms expressing a preferred embodiment 20 of the present inventions. A typical machine tool cutting fluid sump 22 is shown to have bracket 24 clamped in place by screw 26 to support pump 28. Intake pipe 30 extends downwardly, from pump 28 so that its inlet end 31 is submerged beneath the surface of cutting fluids 32 contained in sump 22. Operating periods of electric motor 34 are selected by setting timer 140 to control electrical power supplied on conductors 142 from power source 150. Electric motor 34 drives pump 28 to circulate cutting fluid 32 from sump 22, passing through connecting pipe 36, which extends through side-wall 42 into auxiliary tank 40. Cutting fluid is treated as it flows through tank 40. Cutting fluid 32 contains some undesirable constituents in the form of so-called "tramp oil" and bacteria. Tramp oil comes from machine lubricants, the workpieces and other sources in a machine shop. Since bacteria congregate and breed in tramp oil, its separation and removal is very important to maintaining the condition of cutting fluids. Inasmuch as tramp oil is lighter than cutting fluid, it tends to float, and by placing inlet end 31 no deeper than necessary to avoid breaking suction, some portion of the tramp oil in sump 22 is drawn into pump 28.

A corner of side-wall 42 is broken away to show how the amount of cutting fluid 32 in auxiliary tank 40 is maintained at a predetermined level 48 by drain outlet elbow 44. By draining recirculation fluid from below the surface (preferably at the very bottom) of auxiliary tank 40, return of tramp oil through downpipe 50 to sump 22 is minimized. Elbow 44 extends through tank end-wall 46 to connect with pipe Tee 53. Downpipe 50 connects to pipe Tee 53 and extends downwardly to sump 22. Standpipe 52 connects to pipe Tee 53 and extends upwardly, with its upper end open to the atmosphere to avoid siphoning fluid from tank 40.

Figure 2:
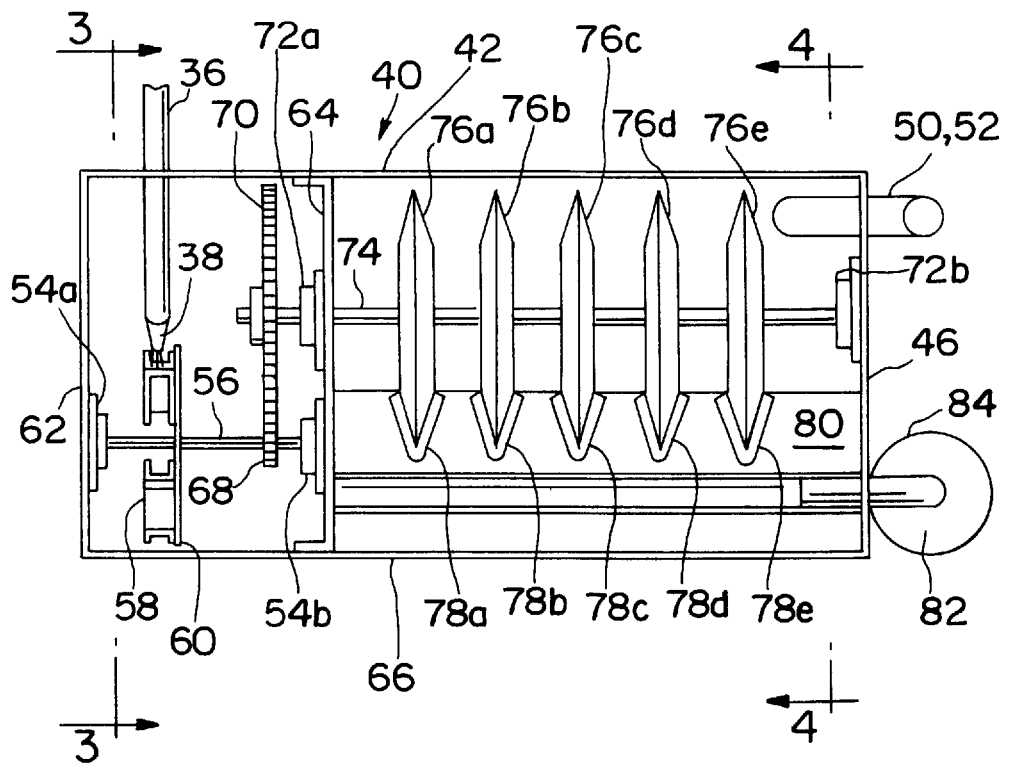
FIG. 2 is a cross-section view of the preferred embodiment taken along cutting plane 2—2 in FIG. 1.

FIG. 2 is taken along cutting plane 2,5—2,5 as indicated in FIG. 1 so as to show a plan view of the interior of auxiliary tank 40.

Figure 3:
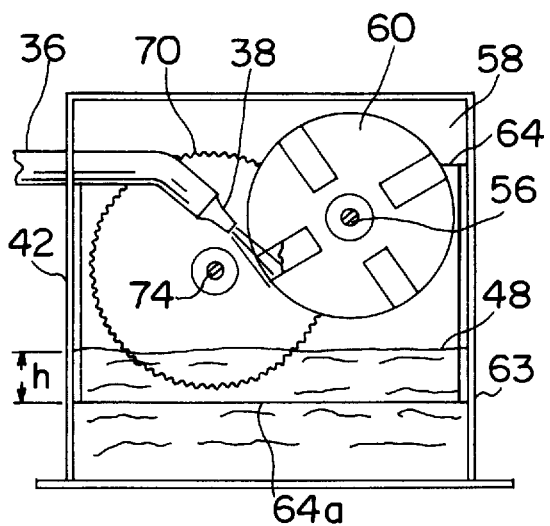
FIG. 3 is a cross-section view taken along cutting plane 3—3 in FIG. 2 to show the rotating drum drive arrangement.

FIG. 3 is a cross-section view taken along cutting plane 3—3 in FIG. 2 to give a better view of drum drive details.

Figure 4:
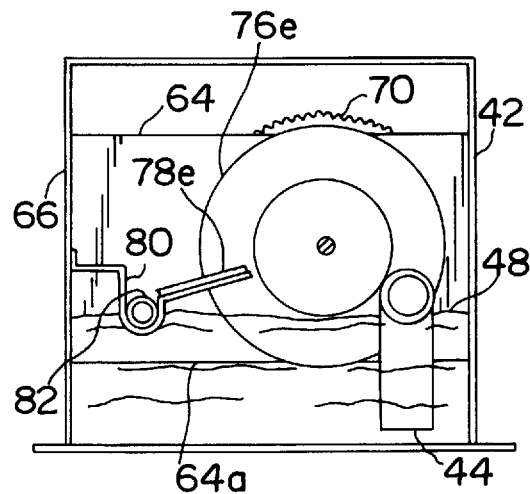
FIG. 4 is a cross-section view taken along cutting plane 4—4 in either FIG. 2 or FIG. 5 to show the rotating drum stripping arrangement.

FIG. 4 is a cross-section view taken along cutting plane 4—4 at the other end of FIG. 2 to show details of the drum stripping arrangement. In FIGS. 2, 3 and 4, pipe 36 is shown passing through sidewall 42, extending into the interior of auxiliary tank 40 and terminating with an outlet nozzle 38. Nozzle 38 accelerates the fluid flow from pipe 36 to a higher velocity and directs flow to impinge on the buckets 60 of turbine wheel 58. This impingement disperses the fluids entering tank 40 so as to aerate these fluids and the overspray that misses turbine buckets 60 agitates the fluids in tank 40 for further beneficial effect. Turbine wheel 58, together with pinion gear 68 are mounted on primary shaft 56 and rotate on bearings 54a and 54b. Bearing 54a is mounted on tank end-wall 62 and bearing 54b is mounted on tank cross-member 64 so that primary shaft 56 rotates on a substantially horizontal axis. Bearing 72a is also mounted on tank cross-member 64 and bearing 72b is mounted on tank end-wall 46. These bearings support secondary shaft 74 for rotation on a substantially horizontal axis that is essentially parallel to that of the primary shaft 56. Bearings 72a and 72b are located so that slow speed gear 70 engages pinion gear 68 to rotate secondary shaft 74 at a speed of one revolution-per-minute or slower.

Cross-member 64 extends below the predetermined fluid level 48 established by drain elbow 44, dividing the fluid contents of tank 40 into two interconnected portions. The tramp oils are agitated to stay in suspension on the inlet side of cross-member 64. At the same time, fluid in contact with oil separating drums 76a–e on the outlet side of cross-member 64 are separated from this agitation and remains relatively quiescent for better oil separation.

In this case, five oil separating drums 76a–e are mounted on secondary shaft 74 to rotate in a partially immersed condition. Drums 76a–e are preferably made of a nonporous material and preferably, although not necessarily, have a tapered edge cross-section. The drums 76a–e rotate slowly through the surface of the fluids 32 in tank 40. The undesirable tramp oil, floating at the surface wets and clings to the surface of drums 76a–e. The rotation of drums 76a–e lifts this tramp oil and carries it up and around to wipers 78a–e. These wipers 78a–e ride against the drum surface and strip the tramp oil from drums 76a–e. The tapered edge serves to maximize the wetted area for a given depth of immersion and also facilitates wiper contact for stripping oils from the drum surface. After stripping, the tramp oil flows off, downward into collecting trough 80. Collecting trough 80 leads into waste outlet tube 82, out through tank end-wall 46 and down, into waste collecting container 84.

According to a feature of the inventions, tank cross member 64 forms a divider or weir separating tank 40 into two chambers. As can be seen in FIGS. 3 and 4, the lower edge 64a of member 64 terminates at a point spaced above the tank bottom wall 41 and below the fluid level 48 to form a passageway. By placing the passageway through member 64 below the fluid level 48, tramp oil tends to remain on the nozzle side of member 64 for easy collection and removal.

Figure 5:
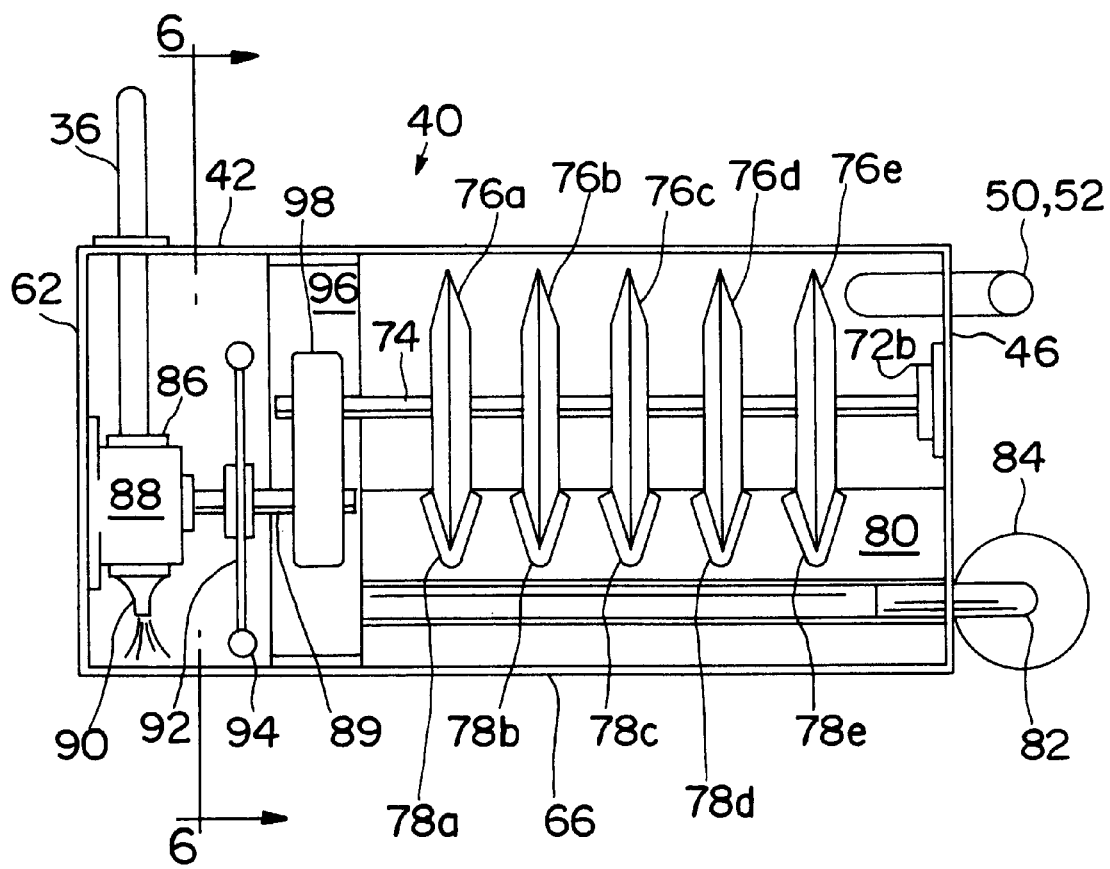
FIG. 5 is a cross-section view similar to FIG. 2 but using an alternative drum drive arrangement.

FIG. 5 is taken along cutting plane 2,5—2,5 as indicated in FIG. 1 so as to show a plan view of the interior of auxiliary tank 40 as it would appear with an alternative drum drive arrangement.

Figure 6:
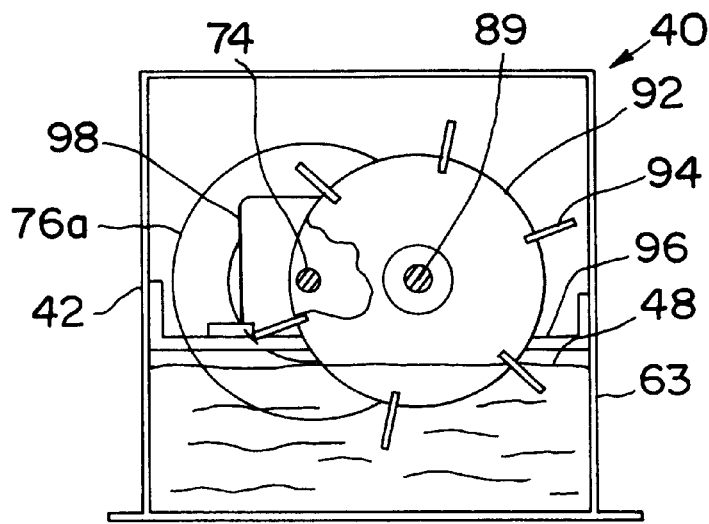
FIG. 6 is a cross-section view taken along cutting plane 6—6 in FIG. 5.

FIG. 6 is a cross-section view taken along cutting plane 6—6 in FIG. 5 to give a better view of the details of this alternative drum drive. In the views of FIGS. 5 and 6, pipe 36 is illustrated passing through sidewall 42, extending into the interior of auxiliary tank 40 and terminating with a flanged fitting 86 adapted to the inlet port of hydraulic motor 88. In this manner, the fluid flow from pipe 36 drives hydraulic motor output shaft 89 to rotate. This arrangement, using a positive displacement pump and motor, provides more positive shaft speed control than the open turbine drive of FIG. 2. In a variation of this drive arrangement, an electric motor could be substituted for hydraulic motor 88 and electrically connected to run whenever hydraulic pump drive motor 34 runs (Ref. FIG. 1). (In this case, the outlet nozzle 38 of pipe 36 would simply be directed so that the pumped fluids impinge on tank back-wall 66). Nozzle 90, fitted to the motor outlet port accelerates the outlet fluid to a higher velocity than that in pipe 36 to impinge on tank back-wall 66. Impingement disperses the fluids entering tank 40 so as to aerate these fluids. Furthermore, agitator wheel 92, with paddles 94 may also be included in this assembly, in which case it is mounted on output shaft 89 and is of sufficient diameter to run partially immersed in the fluids contained in auxiliary tank 40. The rotation of agitator wheel 92 serves to augment circulation effects and agitate the fluids in tank 40 for further beneficial effect. Parallel shaft gear reducer 98 is mounted on tank cross-member 96 and receives hydraulic motor output shaft 89. The relatively high-speed rotation of output shaft 89 is reduced to approximately one revolution-per-minute or less for the output speed of gear reducer 98. Secondary shaft 74 is received by a hollow output shaft furnished in gear reducer 98 at one end and bearing 72b is mounted on tank end-wall 46 to support the other end. In this manner, secondary shaft 74 is supported for rotation on a substantially horizontal axis that is essentially parallel to that of the hydraulic motor output shaft 89.

The embodiment of FIG. 5, as previously shown in FIGS. 2 and 4, has five oil separating drums 76a–e, mounted on secondary shaft 74 to rotate in a partially immersed condition. Drums 76a–e are preferably made of a non-porous material and preferably, although not necessarily, have a tapered edge cross-section. The drums 76a–e rotate slowly through the surface of the fluids 32 in tank 40, preferably less than one revolution per minute. The undesirable tramp oil, floating at the surface and having a greater surface tension than the cutting fluid wets and clings to the surface of drums 76a–e. The rotation of drums 76a–e lifts this tramp oil and carries it up and around to wipers 78a–e. These wipers 78a–e ride against the drum surface and strip the tramp oil from drums 76a–e. The tapered edge serves to maximize the wetted area for a given depth of immersion and also facilitates wiper contact for stripping oils from the drum surface. After stripping, the tramp oil flows off, downward into collecting trough 80. Collecting trough 80 leads into waste outlet tube 82, out through tank end-wall 46 and down, into waste collecting container 84.

Figure 7:
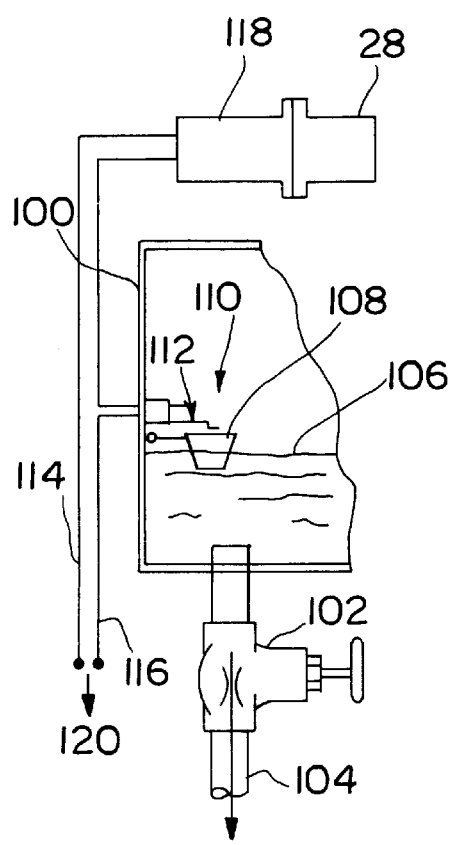
FIG. 7 shows an alternative auxiliary tank drain arrangement.

FIG. 7 shows an alternative structure to maintain a predetermined fluid level 106 in auxiliary tank 100. Here, fluid flows out of tank 100 through ball valve 102 and downpipe 104 to be circulated back to the machine tool sump. Ball valve 102 is regulated to restrict flow to a rate less than is provided by the fluid circulating pump 28. As fluid rises to the predetermined level 106, float 108 of float valve 110 rises to open float switch contacts 112. Opening these contacts breaks the circuit provided by electrical conductors 116 and 114 disconnecting power supply 120 from fluid circulating pump motor 118 and stopping fluid flow into tank 100 until it again falls below predetermined level 106.

Figure 8:
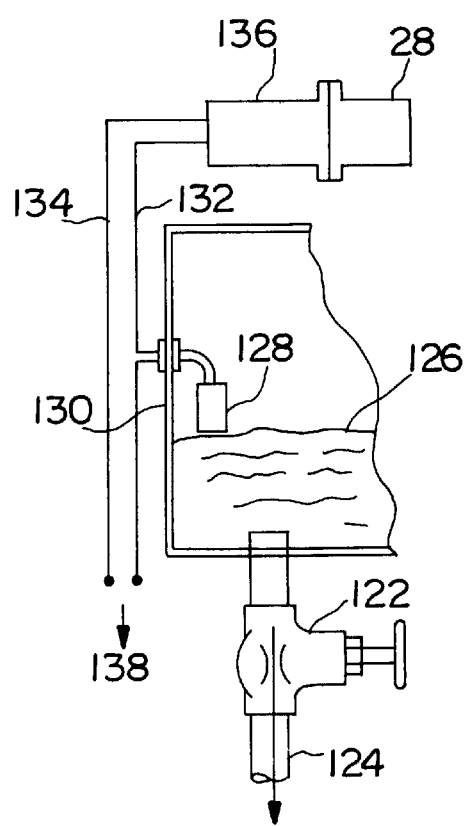
FIG. 8 shows a second alternative auxiliary tank drain arrangement.

FIG. 8 shows a second alternative structure for maintaining a predetermined fluid level 126 in auxiliary tank 100. Here, fluid flows out of tank 130 through ball valve 122 and downpipe 124 to be circulated back to the machine tool sump. Ball valve 122 is regulated to restrict flow to a rate less than is provided by the fluid circulating pump 28. As fluid rises to the predetermined level 126, proximity switch 128 is activated to open its normally closed contacts. Opening these contacts breaks the circuit provided by electrical conductors 132 and 134 disconnecting power supply 138 from fluid circulating pump motor 136 and stopping fluid flow into tank 130 until it again falls below predetermined level 126.

The embodiments shown and described above are exemplary. Many details are often found in the art and, therefore, many such details are neither shown nor described. It is not claimed that all of the details, parts, elements, or steps described and shown were invented herein. Even though numerous characteristics and advantages of the present inventions have been described in the drawings and accompanying text, the description is illustrative only, and changes may be made in the detail, especially in matters of shape, size, and arrangement of the parts within the principles of the inventions to the full extent indicated by the broad general meaning of the terms used in the attached claims.

The restrictive description and drawings of the specific examples above do not point out what an infringement of this patent would be, but are to provide at least one explanation of how to use and make the inventions. The limits of the inventions and the bounds of the patent protection are measured by and defined in the following claims.

What is claimed is:

1. Apparatus to be used for maintaining the condition of cutting fluids in a machine tool sump and the removal of undesirable constituents therefrom, the apparatus comprising:

an auxiliary tank located to receive and contain fluids circulated by the fluid pump at a predetermined level;

a fluid pump connected to pump fluids from the machine tool sump to the auxiliary tank;

a turbine wheel mounted in the auxiliary tank and having a horizontal axis of rotation, with the fluid flow from the pump being directed to rotate the turbine wheel and thereby also aerate the fluid;

a fluid conductor connected to the auxiliary tank to drain excess fluid from the auxiliary tank to the machine tool sump;

a substantially horizontal shaft mounted for rotation in the tank and driven by the turbine wheel;

at least one drum mounted for rotation on the substantially horizontal shaft and being connected to the turbine wheel to be rotated thereby, with a portion of the drum surface rotating below the given fluid level and wetted by the undesirable constituents;

a wiper contacting the drum surface of the at least one rotating drum along a line above the given fluid level so as to strip undesirable constituents from the drum surface; and a collector below the wiper contact line to receive the undesirable constituents from the drum surface.

2. Apparatus to be used for maintaining the condition of cutting fluids in a machine tool sump according to claim 1 wherein the means for limiting the level of the fluids to the predetermined level is a float operated valve.

3. Apparatus to be used for maintaining the condition of cutting fluids in a machine tool sump according to claim 1 wherein the means for limiting the level of the fluids to the predetermined level is a proximity switch operated valve.

4. Apparatus to be used for maintaining the condition of cutting fluids in a machine tool sump according to claim 1 wherein the substantially horizontal drum shaft rotates at a speed of approximately one revolution per minute.

5. Apparatus to be used for maintaining the condition of cutting fluids in a machine tool sump and the removal of undesirable constituents therefrom, the apparatus comprising:

an auxiliary tank located to receive and contain fluids circulated by the fluid pump at a predetermined level;

a dividing member extending from substantially below the predetermined level to substantially above the predetermined level and partitioning the fluid contents of the tank into first and second interconnected portions;

a fluid pump connected to pump fluids from the machine tool sump to the auxiliary tank;

a turbine wheel mounted in the auxiliary tank and having a horizontal axis of rotation, with the fluid flow from the pump being directed to rotate the turbine wheel and thereby also aerate the fluid of the first portion;

a fluid conductor connected to the auxiliary tank to drain excess fluid from the auxiliary tank to the machine tool sump;

a substantially horizontal shaft mounted for rotation in the tank and driven by the turbine wheel;

at least one drum mounted on the substantially horizontal shaft, with a portion of the drum surface rotating below the predetermined level of the second portion and wetted by the undesirable constituents;

a wiper contacting the drum surface of the at least one rotating drum along a line above the predetermined fluid level so as to strip undesirable constituents from the drum surface; and a collector below the wiper contact line to receive the undesirable constituents from the drum surface.

6. Apparatus to be used for maintaining the condition of cutting fluids in a machine tool sump according to claim 5 wherein the means for holding the volume of fluids at a predetermined level is a float operated valve.

7. Apparatus to be used for maintaining the condition of cutting fluids in a machine tool sump according to claim 5 wherein the means for holding the volume of fluids at a predetermined level is a proximity switch.

8. Apparatus to be used for maintaining the condition of cutting fluids in a machine tool sump according to claim 5 wherein the fluid conductor drains fluids from the auxiliary tank from a level significantly below the given level.

9. Apparatus to be used for maintaining the condition of cutting fluids in a machine tool sump according to claim 5 wherein the means for aerating is dispersion of fluids circulated by the fluid pump.

10. Apparatus to be used for maintaining the condition of cutting fluids in a machine tool sump according to claim 5 wherein the means for rotating the at least one drum is an electric motor.

11. Apparatus to be used for maintaining the condition of cutting fluids in a machine tool sump according to claim 5 wherein the means for rotating the at least one drum is a hydraulic motor.

12. Apparatus to be used for maintaining the condition of cutting fluids in a machine tool sump according to claim 5 wherein the means for rotating the at least one drum is a turbine wheel drive by fluids circulated by the fluid pump.

13. Apparatus to be used for maintaining the condition of cutting fluids in a machine tool sump according to claim 5 wherein the means for rotating the at least one drum is a motor.

14. The apparatus of claim 5 further comprising a dispersion wheel mounted to be partially submerged in the fluids and driven to rotate so as to aerate and agitate the fluids.

15. Apparatus to be used for maintaining the condition of cutting fluids in a machine tool sump according to claim 5 wherein the substantially horizontal drum shaft rotates at a speed of approximately one revolution per minute.

16. Apparatus to be used for maintaining the condition of cutting fluids in a machine tool sump and the removal of undesirable constituents therefrom, the apparatus comprising:

a fluid pump connected to circulate fluids from the machine tool sump;

an auxiliary tank located to receive and contain fluids circulated by the fluid pump;

a fluid conductor connected to the tank to drain excess fluid from the auxiliary tank to the machine tool sump;

a substantially horizontally extending shaft mounted for rotation in the tank;

at least one drum mounted on the substantially horizontal shaft, with a portion of the drum surface rotating below the given fluid level and wetted by the undesirable constituents;

a wiper contacting the drum surface of the at least one rotating drum along a line above the given fluid level;

means for rotating the at least one drum concurrently with operation of the fluid circulating pump, so as to rotate the wetted drum surface past the wiper contact line; the means for rotating the at least one drum is a turbine wheel driven by fluids circulated by the fluid pump; and a collector located below the wiper contact line and positioned to receive the undesirable constituents from the drum surface.

17. Apparatus to be used for maintaining the condition of cutting fluids in a machine tool sump according to claim 16 additionally comprising means for limiting the volume of fluids contained by the auxiliary tank to a given level.

18. Apparatus to be used for maintaining the condition of cutting fluids in a machine tool sump according to claim 16 additionally comprising means for aerating fluids circulated by the fluid pump.

19. Apparatus to be used for maintaining the condition of cutting fluids in a machine tool sump according to claim 18 wherein the means for aerating is dispersion of fluids circulated by the fluid pump.

20. Apparatus to be used for maintaining the condition of cutting fluids in a machine tool sump according to claim 16 wherein the means for limiting the volume of fluids is a float operated valve.

21. Apparatus to be used for maintaining the condition of cutting fluids in a machine tool sump according to claim 16 wherein the means for limiting the volume of fluids is a proximity switch.

22. Apparatus to be used for maintaining the condition of cutting fluids in a machine tool sump according to claim 16 the fluid conductor drains fluids from the auxiliary tank from a level significantly below the given level.

23. Apparatus to be used for maintaining the condition of cutting fluids in a machine tool sump and the removal of undesirable constituents therefrom, the apparatus comprising:

- a fluid pump connected to circulate fluids from the machine tool sump;
- an auxiliary tank located to receive and contain fluids circulated by the fluid pump;
- a fluid conductor connected to the tank to drain excess fluid from the auxiliary tank to the machine tool sump;
- a substantially horizontally extending shaft mounted for rotation in the tank;
- at least one drum mounted on the substantially horizontal shaft, with a portion of the drum surface rotating below the given fluid level and wetted by the undesirable constituents;
- a wiper contacting the drum surface of the at least one rotating drum along a line above the given fluid level;
- hydraulic motor connected in fluid communication with the pump to be driven by the flow of fluid from the hydraulic pump, the hydraulic pump being connected to the at least one drum to be rotated thereby so as to rotate the wetted drum surface past the wiper contact line; the means for rotating the at least one drum is a turbine wheel driven by fluids circulated by the fluid pump; and
- a collector located below the wiper contact line and positioned to receive the undesirable constituents from the drum surface.

* * * * *